… … …

United States Patent [19]

Mizoh et al.

[11] Patent Number: 5,508,945
[45] Date of Patent: Apr. 16, 1996

[54] LEVITATION PHENOMENON ANALYZER AND MAGNETIC RECORDING APPARATUS INCLUDING LEVITATION PHENOMENON ANALYZER

[75] Inventors: Yoshiaki Mizoh, Neyagawa; Hiroshi Yohda, Hirakata; Hidetoshi Kotera, Toyonaka; Hiromi Kita, Kashihara, all of Japan

[73] Assignee: Matsushita Electric Industrial Co., Ltd., Osaka, Japan

[21] Appl. No.: 323,606

[22] Filed: Oct. 17, 1994

Related U.S. Application Data

[63] Continuation-in-part of Ser. No. 101,766, Aug. 4, 1993, abandoned.

[30] Foreign Application Priority Data

Aug. 5, 1992 [JP] Japan ................................. 4-209281

[51] Int. Cl.⁶ .................................................. G06F 17/00
[52] U.S. Cl. ........................ 364/563; 364/560; 360/130.24
[58] Field of Search ................................. 364/563, 560; 360/130.24, 32; 369/44.17, 100; 428/141; 324/207.22; 242/179

[56] References Cited

U.S. PATENT DOCUMENTS

| | | | |
|---|---|---|---|
| 4,310,130 | 1/1982 | Ichiyanagi et al. | 242/179 |
| 4,959,743 | 9/1990 | Kochi et al. | 360/130.24 |
| 4,970,707 | 11/1990 | Hara et al. | 369/44.17 |
| 5,008,769 | 4/1991 | Kaneko et al. | 360/130.24 |
| 5,041,937 | 8/1991 | Saito | 360/130.24 |
| 5,051,291 | 9/1991 | Kawahara et al. | 428/141 |
| 5,251,076 | 10/1993 | Hagiwara et al. | 360/32 |
| 5,291,472 | 3/1994 | Lemelson | 369/100 |
| 5,302,893 | 4/1994 | Yoshimura | 324/207.22 |
| 5,307,291 | 4/1994 | Kita et al. | 364/560 |

*Primary Examiner*—James P. Trammell
*Attorney, Agent, or Firm*—Wenderoth, Lind & Ponack

[57] ABSTRACT

A levitation phenomenon analyzer includes: a data input portion for reading data on fluid and structural components and minute structures of a device; a levitation analysis portion for solving basic simultaneous equations of the fluid and the structural components on the basis of the data; and a result output portion for outputting analytical results of the levitation analysis portion; wherein by regarding a flow path of the fluid for levitation analysis as a mean thickness of a air film or regarding the pressure of the fluid as a mean pressure, shapes of the minute structures which are independent of coordinates of nodal points are handled.

3 Claims, 9 Drawing Sheets

LEVITATION PHENOMENON ANALYZER AND MAGNETIC RECORDING APPARATUS INCLUDING LEVITATION PHENOMENON ANALYZER

This application is a continuation-in-part of now abandoned application Ser. No. 08/101,766, filed Aug. 4, 1993.

BACKGROUND OF THE INVENTION

1. Field of the Invention

The present invention relates not only to an apparatus for analyzing levitation phenomenon of a magnetic tape from a rotating magnetic head in a magnetic recording apparatus for use in an audio device, a video device, a computer, etc. but also to the magnetic recording apparatus having a magnetic tape feed mechanism in which the magnetic tape and the magnetic recording head can be held in proper contact with each other at all times.

2. Description of the Prior Art

Figure 2A:
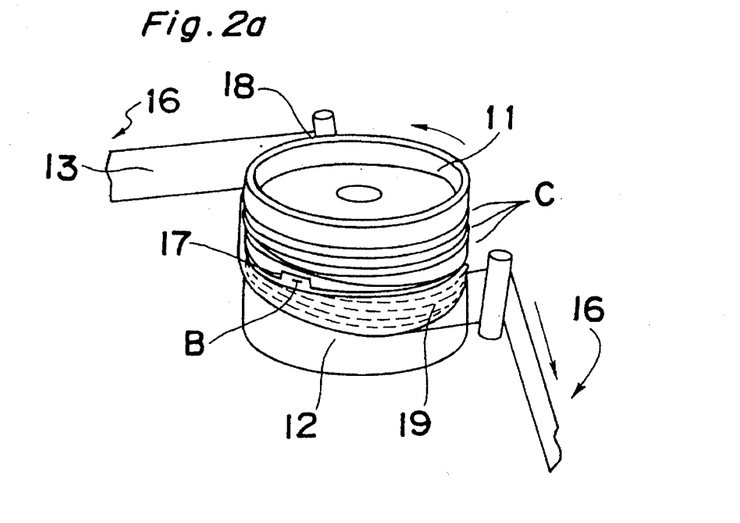
FIG. 2a is a fragmentary perspective view of a video tape recorder (VTR), to which the levitation phenomenon analyzer of FIG. 1 may be applied.
Figures 2B, 2C, 3:
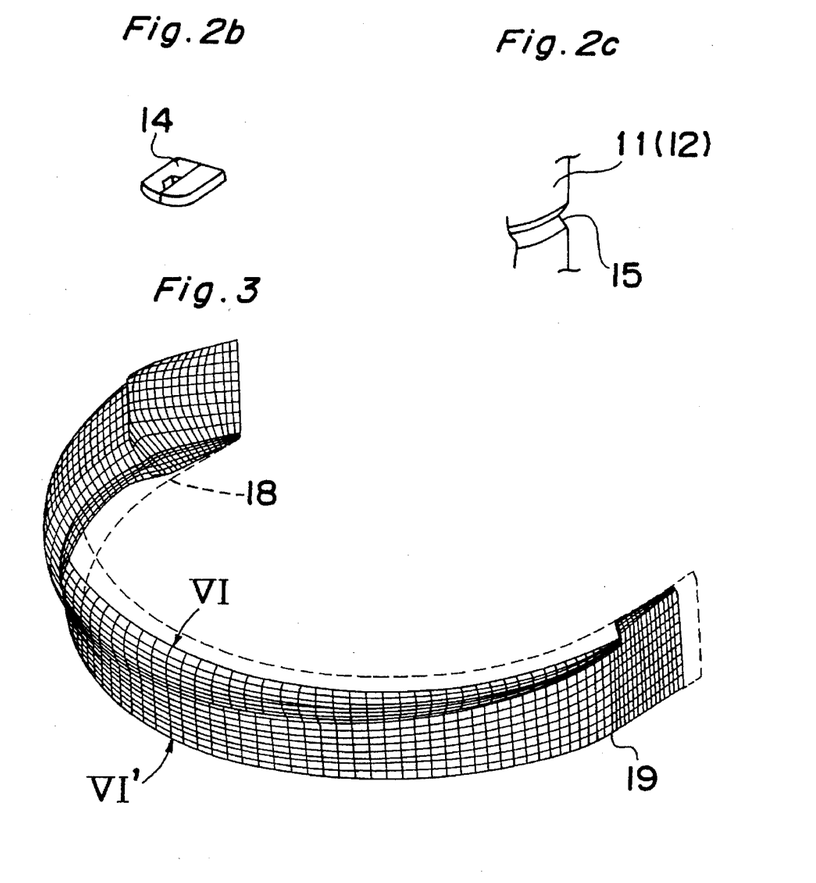

As shown in FIGS. 2a and 2b, a known magnetic recording apparatus such as a video tape recorder (VTR) and a digital audio tape (DAT) device employing a rotational magnetic head and a flexible magnetic tape includes a rotational drum 11, a fixed drum 12, a magnetic head 14 attached to a head mounting window 17 provided on the rotational drum 11, a magnetic tape 13 and a magnetic tape feed mechanism 16 for feeding the magnetic tape 13. A fluid film of air is produced between the rotational drum 11 rotating at high speed and the magnetic tape 13 so as to levitate the magnetic tape from the rotational drum 11. If amount of levitate of the magnetic tape 13 from the rotational drum 11 is not controlled to about several μm, sufficient magnetic recording properties and interchangeability and feed durability of the magnetic tape 13 cannot be obtained.

Conventionally, in order to control the thickness of the air film and reduce the adhesive friction between the magnetic tape 13 and the drums 11 and 12, the rotational drum 11 and the fixed drum 12 are formed with a number of grooves 15 as shown in FIGS. 2a and 2c.

In the structural design of the magnetic recording apparatus, there is a keen demand for the optimization of the shape and positions of the grooves 15, the shape of the head mounting window 17 and the shape of a sliding face of the magnetic head 14. However, at present, these portions are designed through trial and error based on experimental results. Since reproducibility of the experimental results is not satisfactory, the optimum design of the portions has not been effected so far.

Figure 10:
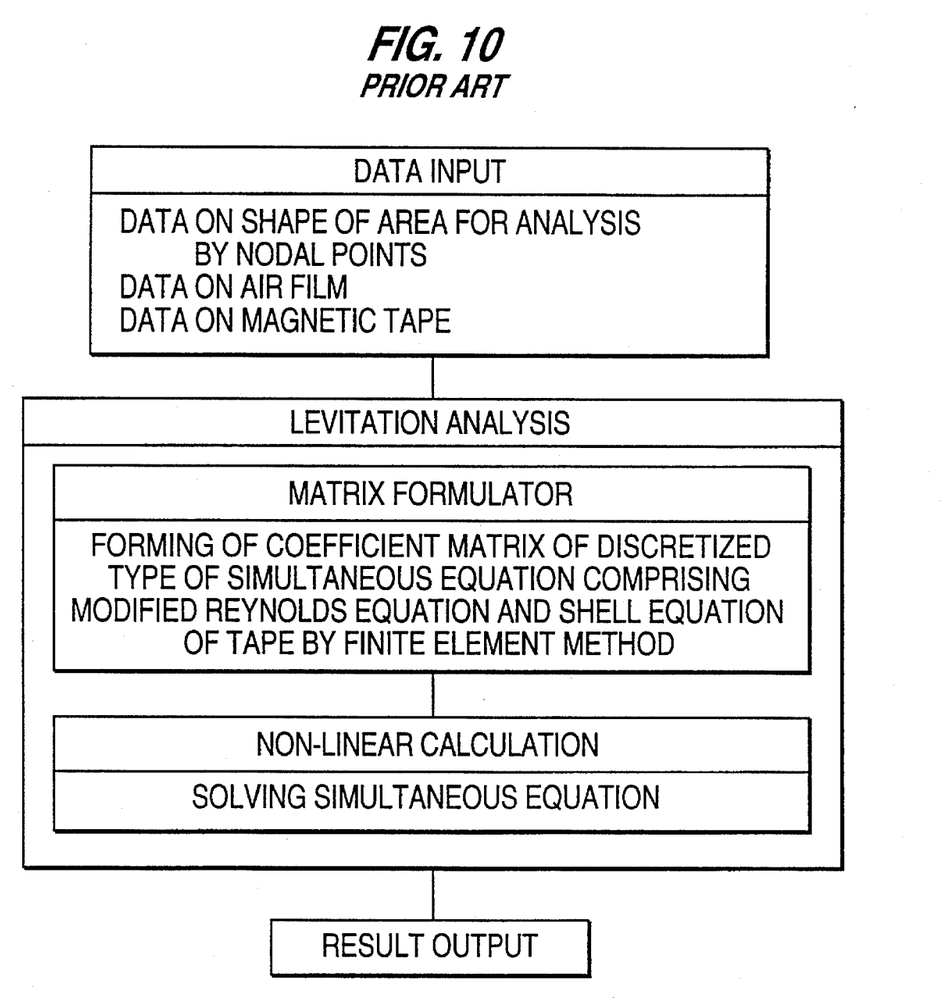
FIG. 10 is a block diagram of a prior art levitation phenomena analyzer.
Figure 11:
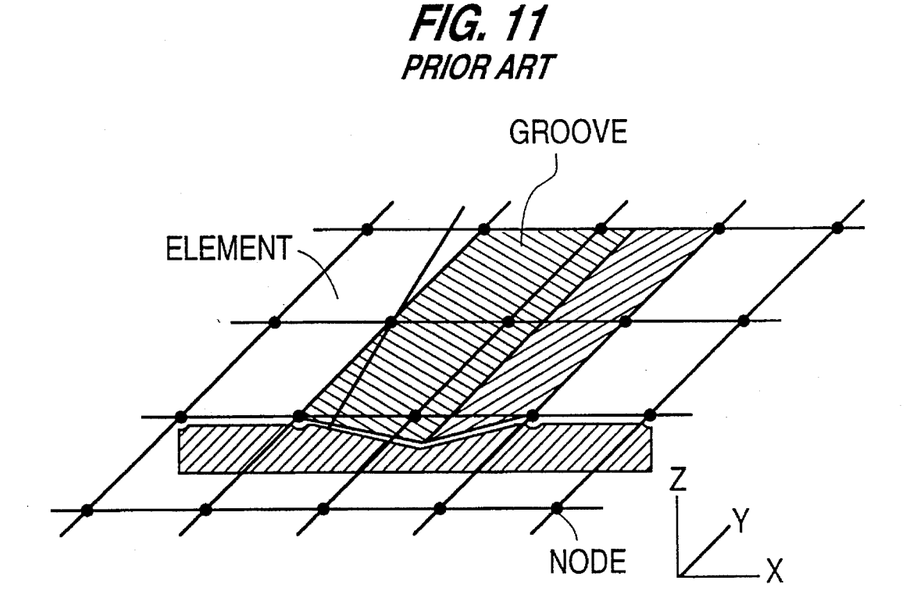
FIG. 11 is a view showing the relationship between minute structures and nodal points in the prior art levitation phenomena analyzer of FIG. 10.

As shown in FIG. 10, an attempt at optimization of the grooves 15 has been made by simulation by a computer. In this computational procedure, structural components of the magnetic recording apparatus including rigid bodies such as the rotational drum 11, the fixed drum 12 and the magnetic head 14 and the magnetic tape 13 subjected to elastic deformation are defined as nodal points and computational solutions for pressures, etc. of fluid in elements such as triangles and quadrangles formed by the nodal points are obtained as shown in FIG. 11. However, in order to express all the many minute structures of the magnetic recording apparatus, for example, the grooves 15, by nodal points and elements and to adapt the minute structures to the simulation by a computer, the computer is required to be provided with a memory having a large storage capacity and the operating time of the computer becomes long. Therefore, practically, it has been so far impossible to calculate the minute structures such as the grooves 15 by the simulation by a computer.

SUMMARY OF THE INVENTION

Accordingly, an essential object of the present invention is to optimize the shapes of various minute structures of a magnetic recording apparatus such as a VTR by the simulation by a computer and to provide the magnetic recording apparatus having the minute structures optimized by the simulation by the computer.

In order to accomplish this object of the present invention, a levitation phenomenon analyzer according to the present invention comprises: a data input portion for reading data on fluid and structural components and minute structures of a device; a levitation analysis portion for solving basic simultaneous equations of the fluid and the structural components on the basis of the data; and a result output portion for outputting analytical results of the levitation floating analysis portion; wherein a thickness of an air film among the minute structures smaller than elements used for analysis is handled as a mixed mean thickness of an air film equal to a sum of arithmetic means and harmonic means of a mean tape levitation height and dimensions of the minute structures and are subjected to convergent calculation by a finite element method. As a result, in a magnetic recording apparatus such as a VTR, the shapes of the minute structures such as grooves, a window and a magnetic head on a drum can be optimized and thus, he shapes of a rotational drum and a fixed drum can be optimized rapidly at a low cost. In the levitation phenomenon analyzer, a flow path of the fluid for levitation analysis is regarded as a mean thickness of an air film such that the shapes of the minute structures which are independent upon the coordinates of nodal points are handled.

The levitation phenomenon and contact of the flexible magnetic tape can be regarded as a coupled problem of structural components and fluid employing a finite element method (Papers of Japanese Society of Mechanical Engineers, C. 597 (1992) "Analysis of floating of tape in VTR (Floating Characteristics of Tape on Whole Drum)" by Kotera et al.). The levitation amount of the tape on the drum of the VTR is generally not more than 100 μm. Therefore, the gaseous lubricant film can be expressed by the following modified Reynolds' equation (1) in view of slip flow.

$$\frac{\partial}{\partial x}\left(H^3 p \frac{\partial p}{\partial x}\right) + \frac{\partial}{\partial y}\left(H^3 p \frac{\partial p}{\partial y}\right) + \\ 6\lambda Pa\left\{\frac{\partial}{\partial x}\left(H^2 \frac{\partial p}{\partial x}\right) + \frac{\partial}{\partial y}\left(H^2 \frac{\partial p}{\partial y}\right)\right\} = \\ 6\mu U \frac{\partial}{\partial x} pH + 6\mu V \frac{\partial}{\partial y} pH \quad (1)$$

Here, the tape floating height H is expressed by the mixed mean thickness of the air film of the following equation (2) which is a sum of the a parallel thickness of air film given by the arithmetic mean of the following equation (3) and a perpendicular thickness of the air film given by the harmonic mean of the following equation (4) (Bulletin of Japanese Society of Mechanical Engineers, C-50, No. 449, p.168 (1984), "Fluid Lubrication Characteristics of Surface Having Roughness Distributed in Two Dimensions" by Mitsuya).

$$\bar{H}^n = \alpha \bar{H}^n + (1-\alpha) \hat{H}^n \quad (2)$$

$$\bar{H}^n = \frac{1}{\Delta x \Delta y} \iint (H_0 + h(x,y))^n dx dy \quad (3)$$

$$\hat{H} = \frac{\overline{H^{-2}}}{\overline{H^{-3}}}, \hat{H}^2 = \frac{1}{\overline{H^{-2}}}, \hat{H}^3 = \frac{1}{\overline{H^{-3}}} \quad (4)$$

In view of mechanical anisotropy of the magnetic tape, the shell equation employs the following equations (5) and (6) as in-plane deformation component and bending deformation component, respectively.

$$\begin{vmatrix} \sigma_x \\ \sigma_y \\ \tau_z \end{vmatrix} = \frac{1}{1 - v_x v_y} \begin{vmatrix} E_x & v_y E_x & 0 \\ v_x E_y & E_y & 0 \\ 0 & 0 & G \end{vmatrix} \begin{vmatrix} \epsilon_x \\ \epsilon_y \\ \gamma_{xy} \end{vmatrix} \quad (5)$$

$$\frac{E_x d^3}{12(1-v_x v_y)} \frac{\partial^4 \omega}{\partial x^4} +$$

$$2 \left( \frac{v_y E_x d^3}{12(1-v_x v_y)} + \frac{G d^3}{6} \right) \frac{\partial^4 \omega}{\partial_x^2 \partial_y^2} +$$

$$\frac{E_y d^3}{12(1-v_x v_y)} \frac{\partial^4 \omega}{\partial_y^4} +$$

$$(\rho U^2 - T) \frac{\partial^2 \omega}{\partial_x^2} = p - Pa \quad (6)$$

In the equations (1) to (6), d denotes the thickness of the magnetic tape, E denotes Young's modulus of the magnetic tape, G denotes the shearing modulus of the magnetic tape, H denotes the mean thickness of the air film between the magnetic tape and the rotational drum, the fixed drum and the magnetic head, p denotes pressure, Pa denotes atmospheric pressure, $H_0$ denotes the spacing between the structural components, h(x,y) denotes shape functions of the minute structures, T denotes a feed tension of the magnetic tape, U denotes a relative speed between the magnetic tape and the rotational drum in the direction of x, V denotes a relative speed between the magnetic tape and the rotational drum in the direction of y, α denotes a ratio of a longitudinal dimension of the minute structures to a lateral dimension of the minute structures, ε denotes a strain produced in the magnetic tape, γ denotes a mean free path of the air, ν denotes Poisson's ratio of the magnetic tape, σ denotes an in-plane stress of the magnetic tape, ρ denotes the density of the magnetic tape, π denotes the shearing stress and ω denotes the displacement of the magnetic tape. Subscripts x and y denote the longitudinal direction and the lateral direction of the magnetic tape, respectively.

These equations are made discrete by the finite element method and the simultaneous equations are solved. Since the modified Reynolds' equation is non-linear, a convergent solution is obtained by the Newton-Raphson method.

As described above, by using the levitation phenomenon analyzer of the present invention, construction of the magnetic recording apparatus can be optimized rapidly at low cost and thus, a magnetic recording apparatus having optimized minute structures can be obtained, which is quite valuable industrially.

BRIEF DESCRIPTION OF THE DRAWINGS

This object and features of the present invention will become apparent from the following description taken in conjunction with the preferred embodiment thereof with reference to the accompanying drawings, in which:

FIG. 2b is an enlarged view of a portion B in FIG. 2a;

FIG. 2c is an enlarged view of a portion C in FIG. 2a;

FIG. 3 is a view indicative of the levitation of a magnetic tape of the VTR of FIG. 2a;

FIG. 4 is a graph showing the distribution of the levitation height of the magnetic tape from a rotational head in the VTR of FIG. 2a;

FIG. 5 is a view showing a magnetic head and a magnetic head mounting portion in the VTR of FIG. 2a;

FIG. 7 is a perspective view showing a projection on the VTR of FIG. 2a;

FIG. 8 is a perspective view showing a recess on the VTR of FIG. 2a;

FIG. 9 is a view showing the relationship between minute structures and nodal points in the VTR of FIG. 2a.

Before the description proceeds, it is to be noted that like parts are designated by like reference numerals throughout several views of the accompanying drawings.

DETAILED DESCRIPTION OF THE INVENTION

Hereinbelow, one embodiment of the present invention is described with reference to the drawings. In this embodiment, the levitation phenomenon of a magnetic tape at the time of rotation of a drum in a video tape recorder (VTR) is analyzed as a coupled problem of the fluid (air film) and the structural components of the VTR and the fluid passing through many minute structures is regarded as the fluid flowing through a mean thickness of the air film such that optimum values of the minute structures are obtained. It should be noted that the structural components of the VTR represent a rotational drum, a fixed drum, a magnetic head and a magnetic tape, while the minute structures of the VTR are smaller in shape than the structural components of the VTR and include, for example, grooves on the rotational drum, grooves on the fixed drum, projections and recesses formed on the fixed drum, shape of the magnetic head, minute shapes on the magnetic head and surface roughness of the magnetic tape. The mean thickness of air film referred to above means a sum of a dimension of the uneven portions of the minute structures and a mean floating height of the magnetic tape. The mean thickness of the air film formed by the minute structures parallel to the flow of the fluid is handled as an arithmetic mean, while the mean thickness of the air film formed by the minute structures perpendicular to the flow of the fluid is handled as a harmonic mean. Thus, the mean thickness of the air film of the minute structures as a whole is handled as a sum of the arithmetic mean and the harmonic mean, i.e. a mixed mean thickness of the air film to be described below.

Figure 1:
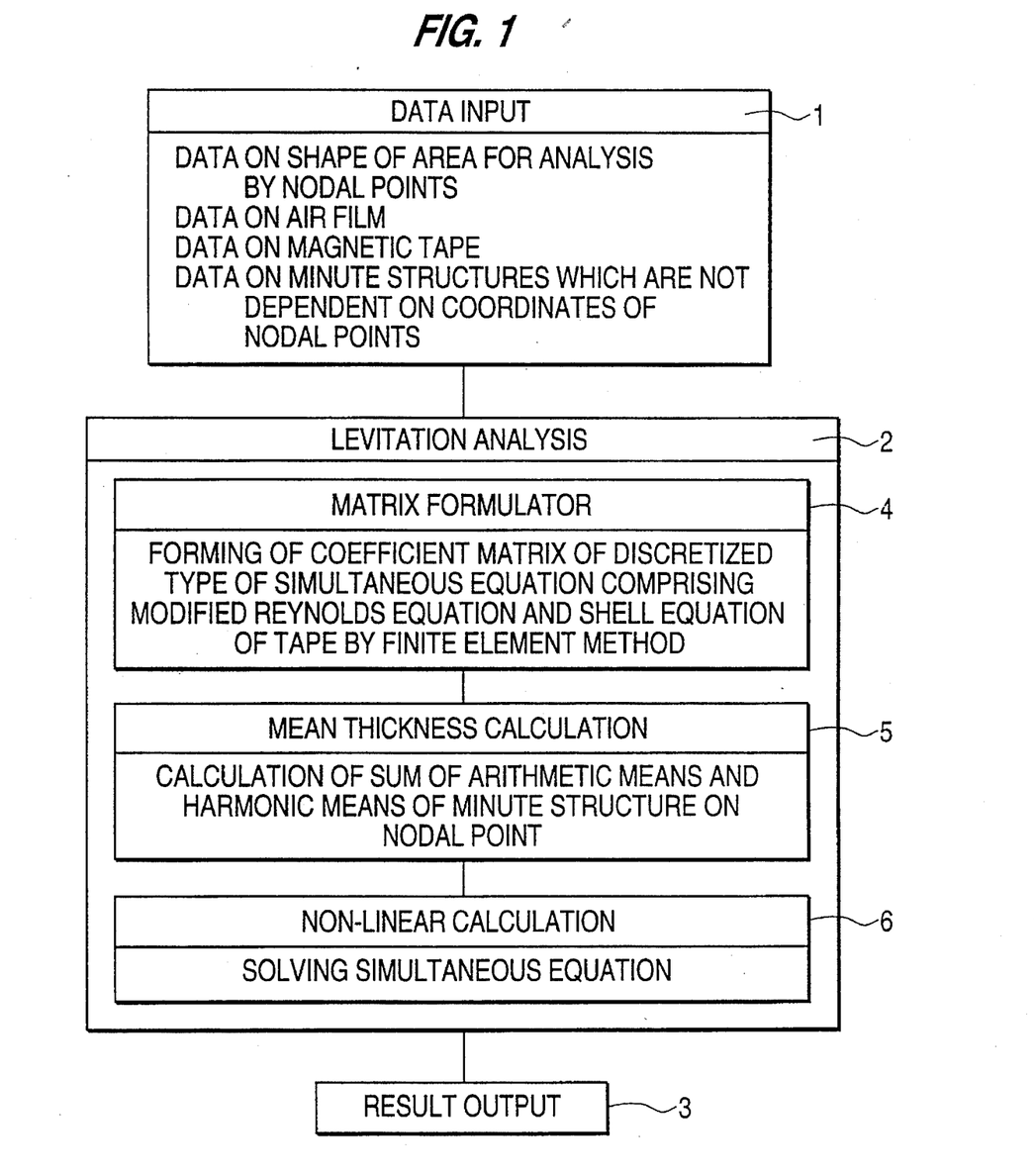
FIG. 1 is a schematic block diagram of a levitation phenomenon analyzer according to the present invention.

FIG. 1 shows a levitation phenomenon analyzer of the present invention. The levitation phenomenon analyzer is constituted by a data input portion 1 for inputting data, a levitation analysis portion 2 and a result output portion 3 for outputting analytical results obtained by the levitation analysis portion 2. The levitation analysis portion 2 includes a matrix formulator 4 for formulating coefficient matrix of simultaneous equations of the fluid and the minute structures on the basis of the inputted data, a calculating portion 5 for obtaining the mean thickness of air film by regarding a flow path of the fluid as the mixed mean thickness of air film and a non-linear convergent calculating portion 6 for performing non-linear calculations repeatedly.

Namely, the data input portion 1 is a processor to which data on nodal points of a plurality of sections of simple shape obtained by dividing an area for analysis and elements formed by the nodal points, shapes of the minute structures handled as the mean thickness of air film, various physical properties of the air film, the magnetic tape, boundary conditions, etc. are inputted.

The matrix formulator 4 of the levitation analysis portion 2 is a processor which formulates the coefficient matrix of the simultaneous equations of the fluid and the minute structures on the basis of the data inputted to the data input portion 1. The pressure p due to the air film is expressed by a modified Reynolds' equation as follows.

$$\frac{\partial}{\partial x}\left(H^3 p \frac{\partial p}{\partial x}\right) + \frac{\partial}{\partial y}\left(H^3 p \frac{\partial p}{\partial y}\right) + \quad (1)$$

$$6\lambda Pa \left\{ \frac{\partial}{\partial x}\left(H^2 \frac{\partial p}{\partial x}\right) + \frac{\partial}{\partial y}\left(H^2 \frac{\partial p}{\partial y}\right) \right\} =$$

$$6\mu U \frac{\partial}{\partial x} pH + 6\mu V \frac{\partial}{\partial y} pH$$

Meanwhile, displacement w of the magnetic tape is expressed by shell equations (5) and (6).

$$\begin{vmatrix} \sigma_x \\ \sigma_y \\ \tau_z \end{vmatrix} = \frac{1}{1-v_x v_y} \begin{vmatrix} E_x & v_y E_x & 0 \\ v_x E_y & E_y & 0 \\ 0 & 0 & G \end{vmatrix} \begin{vmatrix} \epsilon_x \\ \epsilon_y \\ \gamma_{xy} \end{vmatrix} \quad (5)$$

$$\frac{E_x d^3}{12(1-v_x v_y)} \frac{\partial^4 \omega}{\partial x^4} + \quad (6)$$

$$2\left(\frac{v_y E_x d^3}{12(1-v_x v_y)} + \frac{G d^3}{6}\right) \frac{\partial^4 \omega}{\partial x^2 \partial y^2} +$$

$$\frac{E_y d^3}{12(1-v_x v_y)} \frac{\partial^4 \omega}{\partial y^4} +$$

$$(\rho U^2 - T) \frac{\partial^2 \omega}{\partial x^2} = p - Pa$$

The calculating portion 5 of the levitation analysis portion 2 is a processor in which from the thickness of air film formed by the structural components and given for each nodal point and each element by initial conditions or the repeated calculations, first- to third-degree terms of the thickness of air film of the arithmetic mean is obtained by using the following equation (3) and first- to third terms of the thickness of air film of the harmonic mean is obtained by using the following equation (4) so as to obtain a thickness of air film due to minute perturbation obtained from data on shapes of the minute structures, i.e. first- to third degree terms of the mixed mean thickness H of air film of the following equation (2).

$$H^n = \alpha \bar{H}^n + (1-\alpha) \hat{H}^n \quad (2)$$

$$\bar{H}^n = \frac{1}{\Delta x \Delta y} \iint (H_0 + h(x,y))^n dx dy \quad (3)$$

$$\hat{H} = \frac{\overline{H^{-2}}}{\overline{H^{-3}}}, \hat{H}^2 = \frac{1}{\overline{H^{-2}}}, \hat{H}^3 = \frac{1}{\overline{H^{-3}}}. \quad (4)$$

The non-linear convergent calculating portion 6 is a processor which makes the equations (1), (5) and (6) discrete by, for example, a weighted residual method in order to analyze the equations (1), (5) and (6) by a finite element method and perform convergent calculations of the non-linear simultaneous equations by the Newton-Raphson method, etc. For example, first- to third-degree terms of the arithmetic mean and the harmonic mean of a thickness of air film obtained by adding the depth of the grooves to the thickness of air film (tape levitation height) obtained by the repeated calculations between the magnetic tape and a drum having no grooves are obtained, respectively and the mixed mean thickness H of the air film is substituted for the modified Reynolds' equation (1). By performing the calculations of the mixed mean thickness of the air film repeatedly, a convergent solution is obtained.

The result output portion 3 is a processor such as a printer, a cathode-ray tube (CRT), a plotter, etc. which outputs the data obtained by the levitation analysis portion 2 on the shape and stress distribution of the magnetic tape, the pressure distribution of the air film, the thickness of air film between the minute structures and the magnetic tape (for example, the tape levitation height on a magnetic gap), etc.

A number of grooves 15 are formed on the rotational drum 11 and the fixed drum 12 as shown in FIGS. 2a and 2c. For example, in a VTR of VHS format, six V-shaped grooves having a width of 100 μm and a depth of 50 μm are formed on the rotational drum 11 at an interval of 1.5 mm. FIG. 3 shows the amount of deformation of the magnetic tape as analytical results of the levitation phenomenon analyzer employing the minute structures of the VTR. The parameters used for the calculations in the levitation phenomenon analyzer are shown in Table 1 below.

TABLE 1

| [Fluid] | |
| --- | --- |
| Viscosity coefficient (μ) | 17.9 μ · s |
| Mean free path of air (λ) | 0.064 μm |
| Atmospheric pressure (Pa) | 0.101 MPa |
| [Magnetic tape] | |
| Longitudinal Young's modulus (Ex) | 6.0 GPa |
| Lateral Young's modulus (Ey) | 4.8 GPa |
| Poisson's ratio (v) | 0.44 |
| Thickness of tape (d) | 18.5 μm |
| [VTR] | |
| Format | VHS |
| Relative speed (V) | 5.8 m/s |
| Feed tension (T) | 23.4 N/m |

Figure 4:
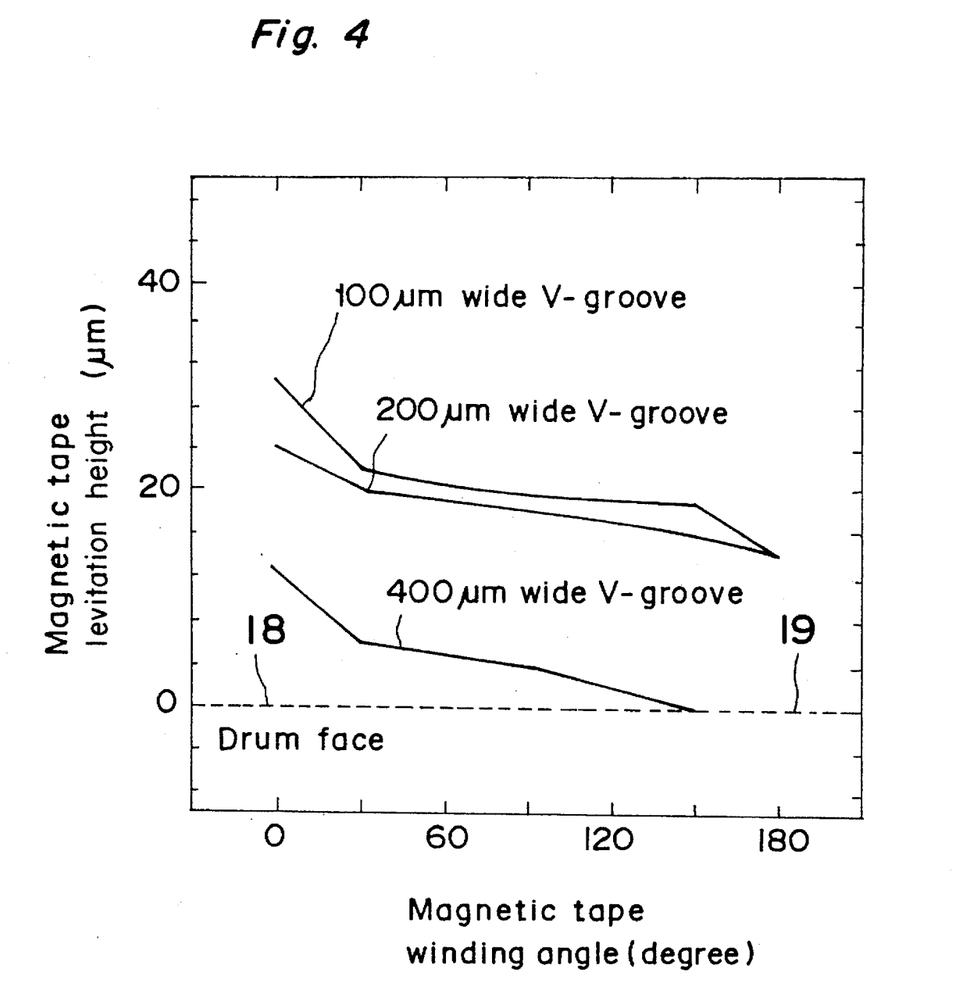
Figure 6:
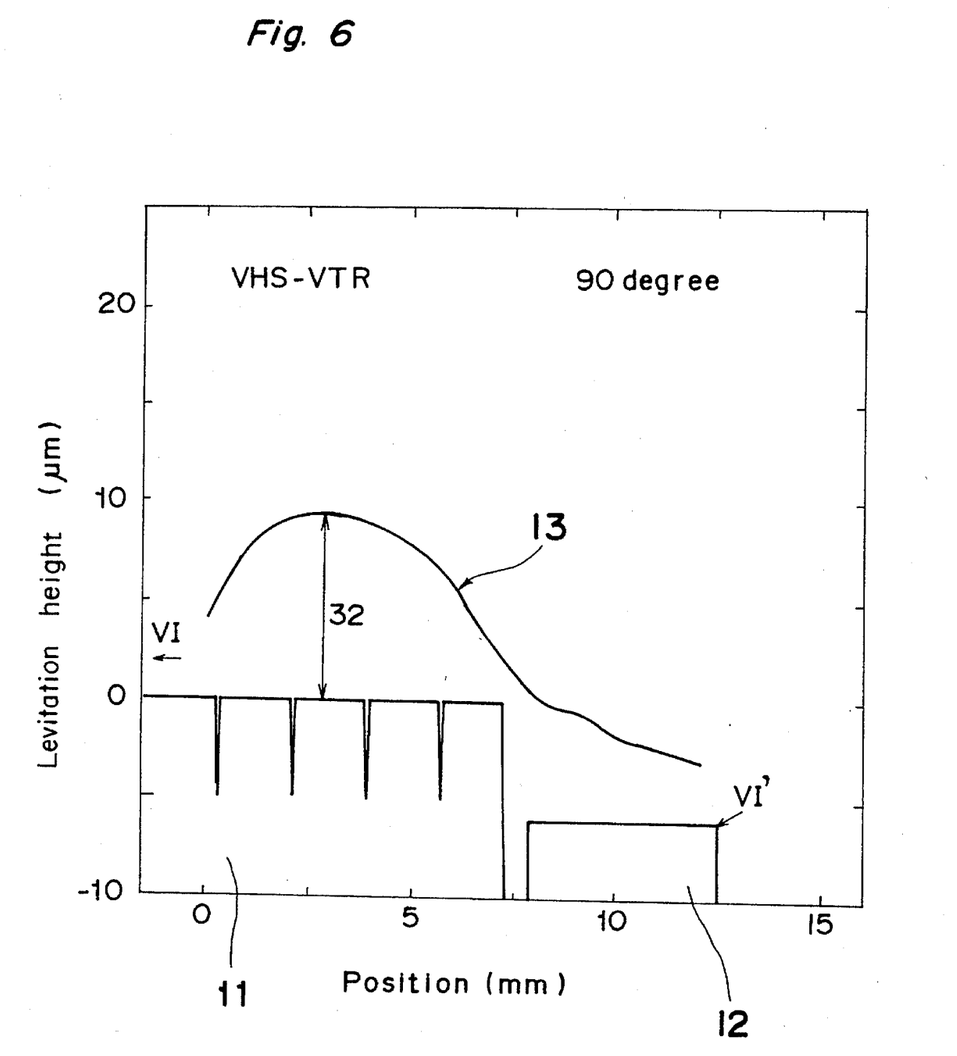
FIG. 6 is a graph showing the levitation of the magnetic tape of FIG. 3 along the line VI—VI' in FIG. 3.
Figure 9:
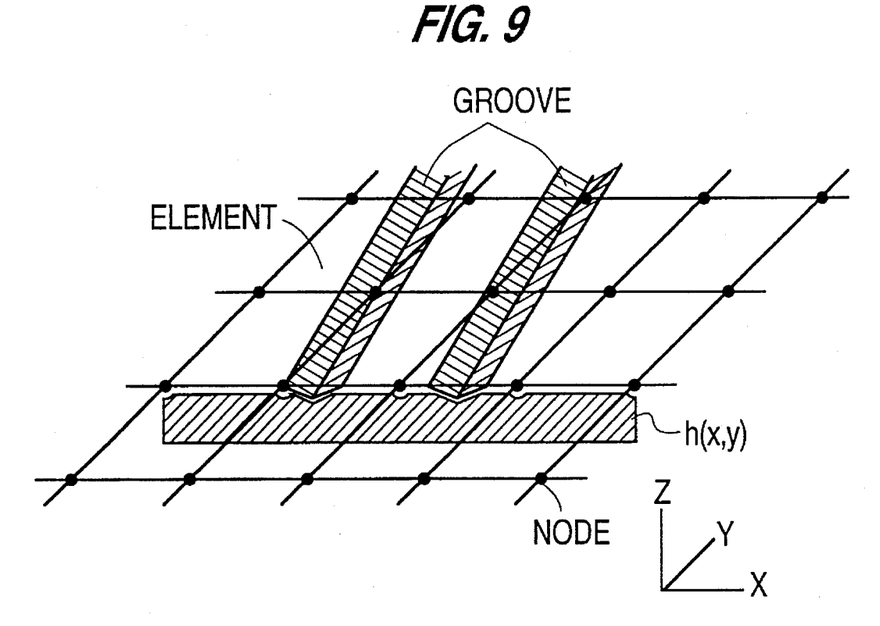

FIG. 6 shows the levitation height of the magnetic tape along the line VI—VI' in FIG. 3. It is seen from FIG. 6 that the magnetic tape levitates on the rotational drum 11 greatly. FIG. 4 shows maximum levitation height 32 (FIG. 6) of the magnetic tape on the rotational drum 11 from a tape inlet 18 to a tape outlet 19 relative to the rotational drum 11. It will be understood from FIG. 4 that the magnetic tape 13 levitates on the rotational drum 11 and the levitation height of the magnetic tape 13 decrease from the tape inlet 18 towards the tape outlet 19. An interval of the nodal points used for the calculations in the levitation phenomenon analyzer is widthwise about 400 μm and the minute structures referred to earlier cannot be expressed by the nodal points as shown in FIG. 9. In FIG. 4, the analytical results of a case in which the grooves having a width of 200 μm and a depth of 100 μm are provided at an interval of 1.5 mm and a case in which the grooves having a width of 400 μm and a depth of 200 μm are provided at an interval of the 1.5 mm are shown as changes of maximum levitation height of the magnetic tape on the rotational drum 11. It is apparent from FIG. 4 that the levitation height of the magnetic tape in the case of the grooves of 200 μm in width is smaller than that in the case of the grooves of 100 μm in width and the inclination of the levitation height of the magnetic tape in the case of the grooves of 200 μm in width decreases as compared with that in the case of the grooves 100 μm in width. Thus, by increasing width of the grooves, contact between the magnetic tape and the magnetic head is made uniform. However, when the width of the grooves is 400 μm, the magnetic tape and the drum are brought into contact with each other, thereby possibly resulting in a deterioration of feed durability. By performing this calculation for various shapes and positions of the grooves, it becomes possible to optimize the shape and positions of the grooves. If this is made by experiments, great painstaking operations and large expenses for the production of a number of drums having the grooves of various shapes, the measurement of the tape levitation height by using an optical micrometer, etc. are incurred. Furthermore, due to scatter in machining accuracy, scatter in quality of the magnetic tape and instability of a tape feed mechanism, it is quite difficult to perform such measurements with a high reproducibility. Therefore, optimization of the configuration of the grooves by the simulation by a computer is of great value.

If the calculation of the configuration of the grooves is performed by defining the grooves as nodal points and elements, a great number of the nodal points and elements must be provided. As a result, the capacity of the computer must be large and the operating time of the computer becomes long. In addition, each time that the configuration of the grooves is changed, new nodal points and elements must be formulated again. Accordingly, this calculation is not suitable for practical use. However, in the present invention, since the calculation is performed in the calculating portion 5 by referring to the data on the structural components, only the data on the shapes of the minute structures must be changed and thus, effects of the minute structures can be subjected to the simulation by a computer in a short period of time.

Figure 7:
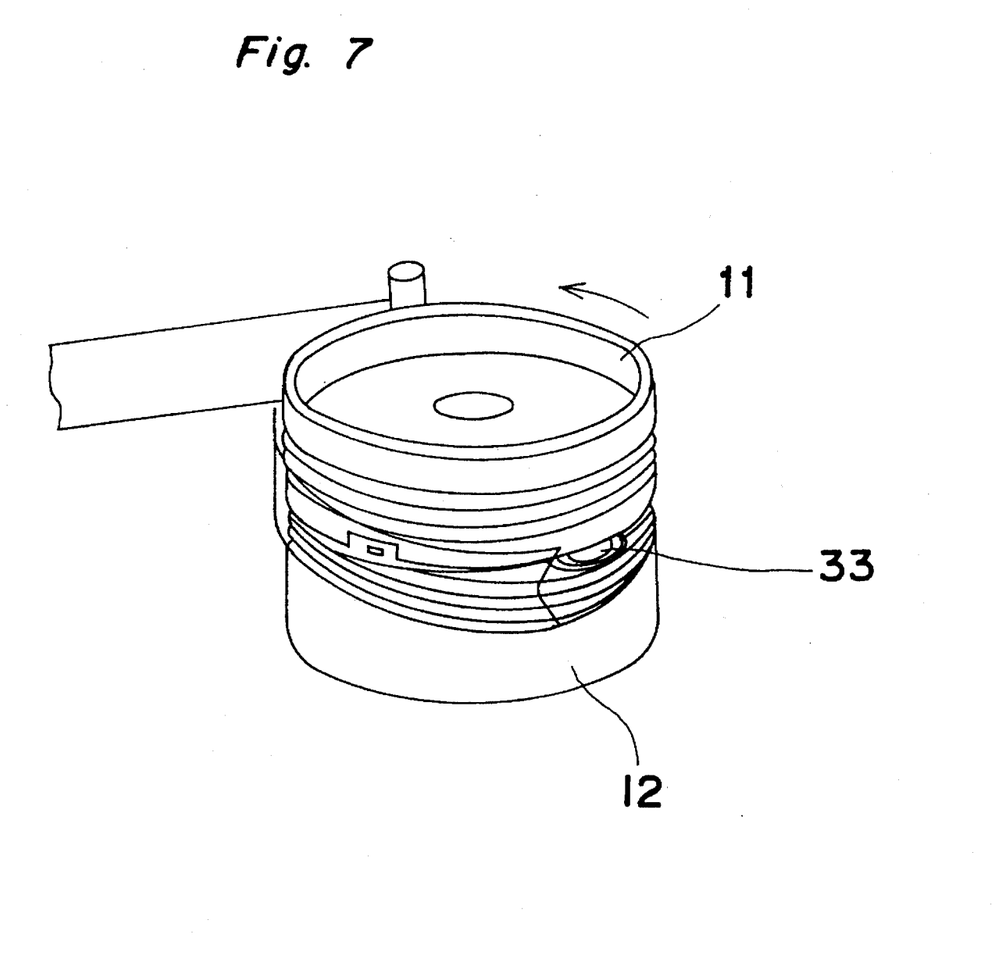
Figure 8:
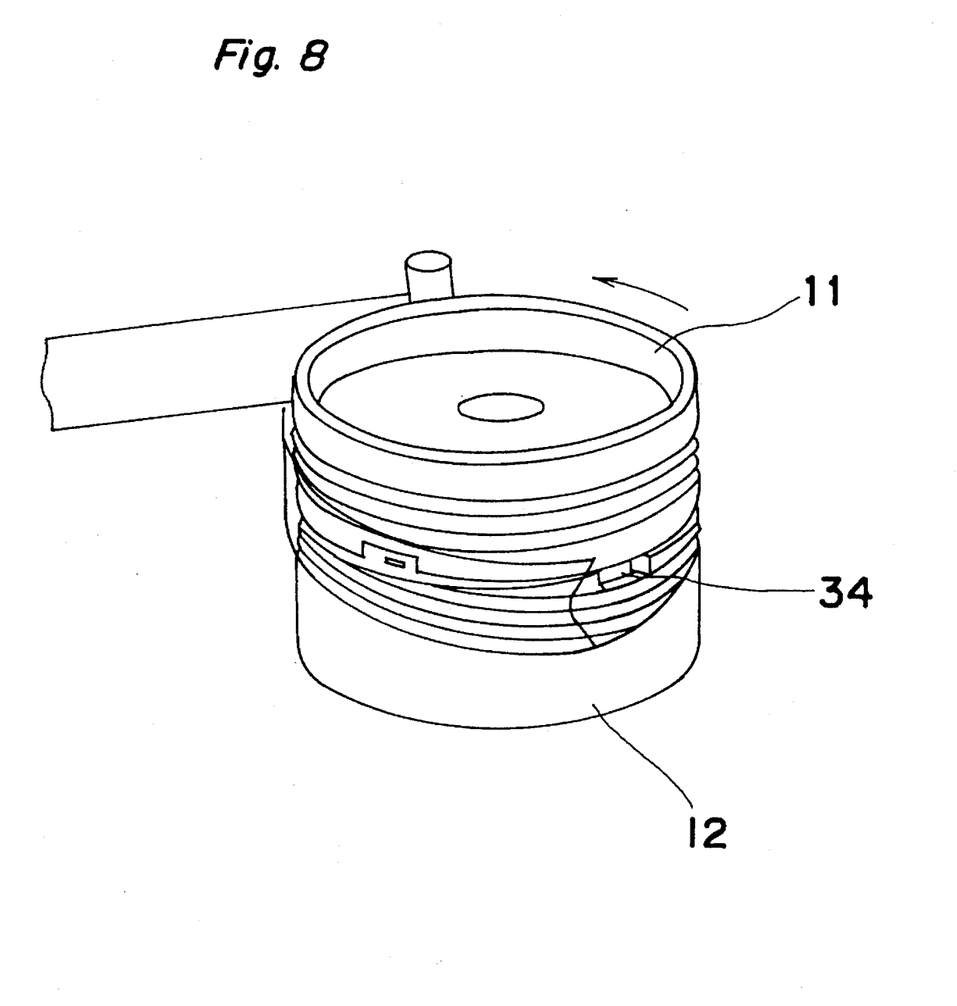

In this embodiment, the optimization of the grooves of the rotational drum of the VTR has been described. However, the present invention is effective also for the optimization of configuration of the grooves on the fixed drum, a tapered portion which is not parallel to a rotary spindle and is provided on the rotational drum, etc. Meanwhile, the present invention is also effective for the optimization of shape of projections 33 which are provided at the tape inlet 18 and the tape outlet 19 as shown in FIG. 7 so as to bring the magnetic tape into smooth contact with the grooves the fixed drum and the magnetic head such that jitter, etc. is reduced. Furthermore, the present invention is also effective for the optimization of recesses 34 which are provided at a tape inlet and tape outlet of the fixed drum as shown in FIG. 8 so as to control the levitation height of the magnetic tape such that an excellent envelope is obtained. It is needless to say that the present invention can be applied to not only the upper rotational drum but also to an intermediate rotational drum. Moreover, in the present invention, it is also possible to optimize the configuration of the grooves of the fixed drum at the time of ordinary reproduction and special reproduction in view of the tape feed rate.

Figure 5:
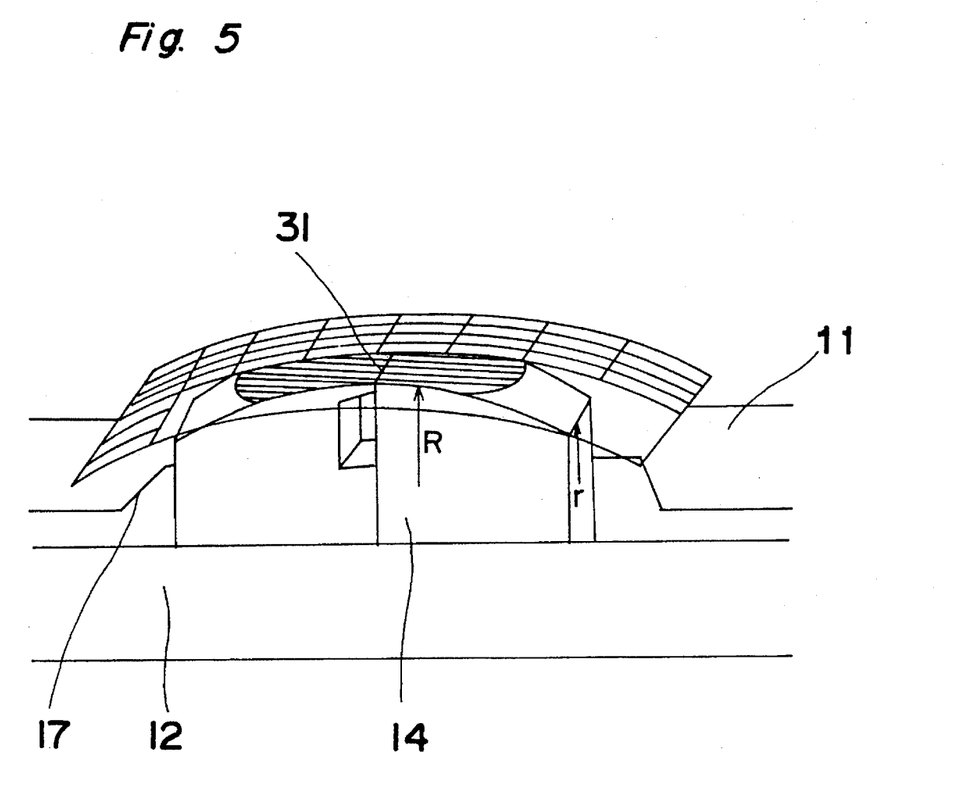

As shown in FIG. 5, when a magnetic head 14 and a head mounting window 17 are handled as minute structures on the rotational drum 11 and the shapes of the minute structures are optimized as the mixed mean thickness of the air film referred to earlier, not only is the magnetic tape and the magnetic head 14 brought into contact with each other properly but excellent magnetic recording properties are obtained quite effectively. As a result, an optimum radius R of curvature of a tape sliding face 31 of the magnetic head 14 in the longitudinal direction of the magnetic head 14 and an optimum radius r of curvature of the tape sliding face 31 in the lateral direction of the magnetic head 14 can be determined. In addition, it is also possible to analyze and optimize the shape of minute nonuniform wear, etc.

In the above embodiment, the VTR is employed as one example. However, it goes without saying that the present invention can be applied also to (1) a magnetic recording apparatus having a rotational drum, such as a digital audio tape (DAT) device, (2) a magnetic recording apparatus having a rotating recording medium, such as a hard disk device and a floppy disk device and (3) a magnetic recording apparatus in which the magnetic tape is slid on the fixed drum at high speed, such as an audio cassette tape device and a streamer magnetic recording apparatus for a computer.

In this embodiment, the mixed mean thickness of the air film expressed by the sum of the arithmetic mean and the harmonic mean is employed as the mean thickness of air film but may also be replaced by a mere arithmetic mean thickness of the air film, a procedure employing a mean flow rate and a procedure in which pressure in the grooves is set to a mean pressure.

In the above embodiment, the analysis based on a modified Reynolds' equation has been described by way of example but a modified Reynolds' equation may be replaced by a Navier-Stokes' equation and a Boltzmann's equation. Meanwhile, the shell equation is a first-degree equation of elastic deformation but may also incorporate higher-degree stress components. Furthermore, in a this embodiment, finite element method as one example is employed for numerical analysis but may also be replaced by a differential element method, a boundary integral method and a boundary element method. As a solution of the finite element method, the calculus of variations, the Galerkin method and a penalty method may be employed in addition to a weighted residual method.

Meanwhile, the floating analysis portion of the present invention may also be materialized by software using a computer or firmware. In the present invention, it is also effective to perform neural processing of the output results through learning so as to optimize the configuration of the drum, etc.

What is claimed is:

1. A magnetic recording apparatus comprising:
   a rotational drum;
   a fixed drum;
   a magnetic head; and
   a magnetic tape;
   the rotational drum having at least one of a plurality of grooves and a head mounting portion for mounting the magnetic head on the rotational drum, whose configuration is designed by a levitation phenomenon analyzer;

the levitation phenomenon analyzer comprising:
- a data input portion for reading data on fluid and structural components and minute structures of the magnetic recording apparatus;
- a levitation analysis portion for solving basic simultaneous equations of the fluid and the structural components on the basis of the data;
- the levitation analysis portion including a calculating portion in which a thickness of an air film among the minute structures smaller than intervals of nodal points and elements for analysis is handled as a mixed mean thickness of the air film;
- the mixed mean thickness of the air film being a sum of an arithmetic mean and a harmonic mean of a mean tape levitation height and dimensions of the minute structures; and
- a result output portion.

2. A magnetic recording apparatus comprising:

a rotational drum;

a fixed drum;

a magnetic head; and a magnetic tape;

the fixed drum having at least one of a plurality of grooves, a projection and a recess, whose configuration is designed by a levitation phenomenon analyzer;

the levitation phenomenon analyzer comprising:
- a data input portion for reading data on fluid and structural components and minute structures of the magnetic recording apparatus;
- a levitation analysis portion for solving basic simultaneous equations of the fluid and the structural components on the basis of the data;
- the levitation analysis portion including a calculating portion in which a thickness of an air film among the minute structures smaller than intervals of nodal points and elements for analysis is handled as a mixed mean thickness of the air film;
- the mixed mean thickness of the air film being a sum of an arithmetic mean and a harmonic mean of a mean tape levitation height and dimensions of the minute structures; and
- a result output portion.

3. A magnetic recording apparatus comprising:

a rotational drum;

a fixed drum;

a magnetic head; and a magnetic tape;

the magnetic heading having a sliding face for the magnetic tape, whose configuration is designed by a levitation phenomenon analyzer;

the levitation phenomenon analyzer comprising:
- a data input portion for reading data on fluid and structural components and minute structures of the magnetic recording apparatus;
- a levitation analysis portion for solving basic simultaneous equations of the fluid and the structural components on the basis of the data;
- the levitation analysis portion including a calculating portion in which a thickness of an air film among the minute structures smaller than intervals of nodal points and elements for analysis is handled as a mixed mean thickness of the air film;
- the mixed mean thickness of the air film being a sum of an arithmetic mean and a harmonic mean of a mean tape levitation height and dimensions of the minute structures; and
- a result output portion.

* * * * *